United States Patent [19]

Babb

[11] 4,057,352

[45] Nov. 8, 1977

[54] COLOR GRADING APPARATUS UTILIZING INFRARED LIGHT SOURCE

[75] Inventor: Raymond E. Babb, Fremont, Calif.

[73] Assignees: Genevieve I. Hanscom; Robert M. Magnuson; Lois J. Thomson, Calif.; part interest to each

[21] Appl. No.: 686,021

[22] Filed: May 13, 1976

[51] Int. Cl.² .......................... G01J 3/50; G01N 21/22
[52] U.S. Cl. .................................. 356/178; 209/111.5; 209/111.6; 250/226
[58] Field of Search ............... 356/173, 176, 178, 186, 356/188, 190, 51; 250/226; 209/111.6, 111.5

[56] References Cited

U.S. PATENT DOCUMENTS

| Re. 29,031 | 11/1976 | Irving et al. ............ 356/178 X |
| 2,933,613 | 4/1960 | Powers .................. 209/111.6 X |
| 2,982,408 | 5/1961 | Blackburn et al. ........... 209/111.6 |
| 2,988,219 | 6/1961 | Bartlett ................... 209/111.6 |
| 3,382,975 | 5/1968 | Hoover ................. 209/111.6 X |

OTHER PUBLICATIONS

Desrosier et al, Food Engineering, May 1952, pp. 92, 93, 190 and 192.
Smith, Food Engineering, Sept. 1953, p. 53.

*Primary Examiner*—F. L. Evans
*Attorney, Agent, or Firm*—GeraldL. Moore

[57] ABSTRACT

Apparatus for color grading of products, such as fruits, vegetables, et cetera, employing light sources for illuminating the products in the infrared and green or lower wavelengths, and means for detecting and comparing the reflectance in the two light regions to measure certain properties of the product. The light source used for the infrared radiation is an improved gas discharge lamp utilizing argon gas.

3 Claims, 6 Drawing Figures

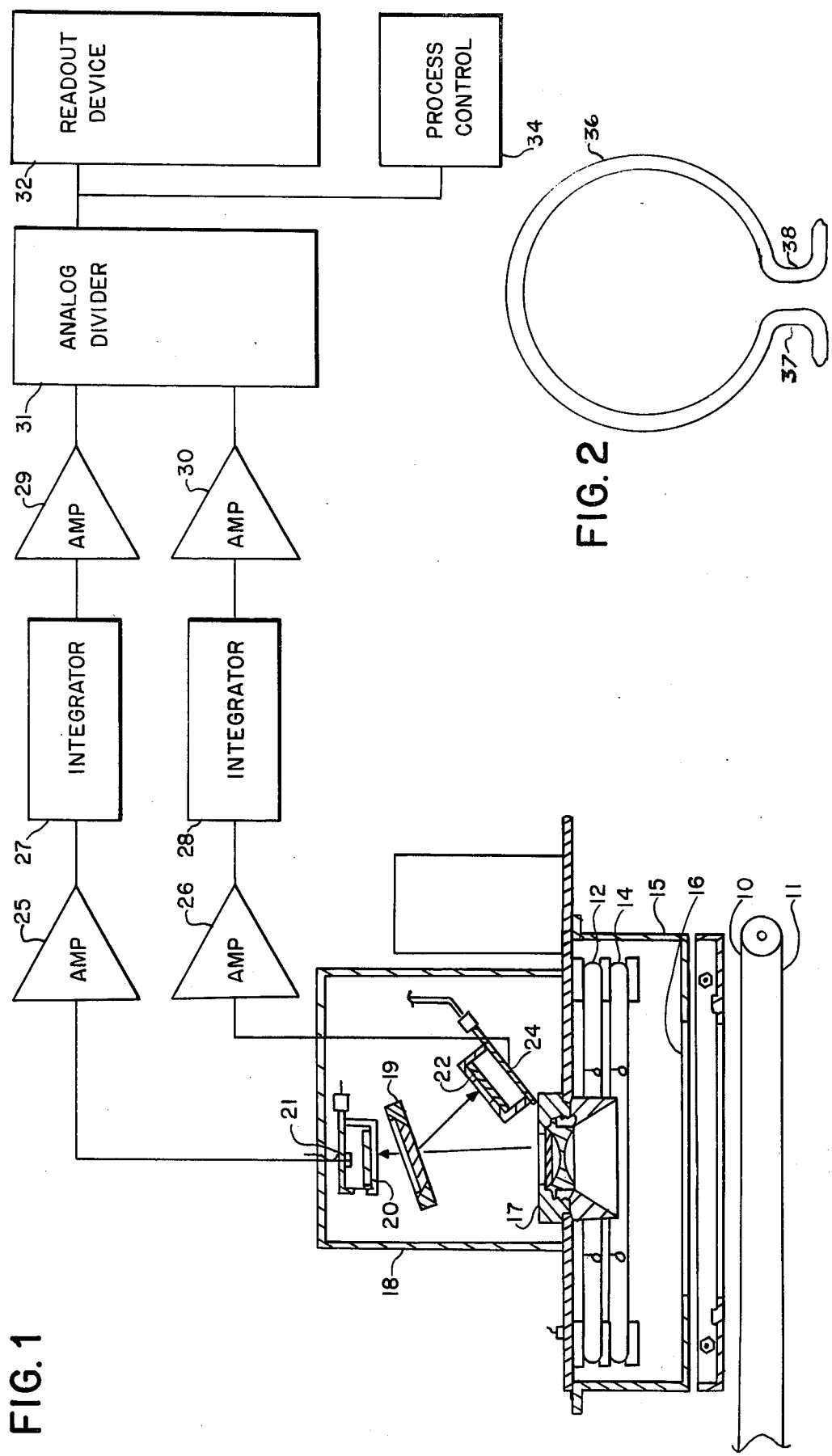

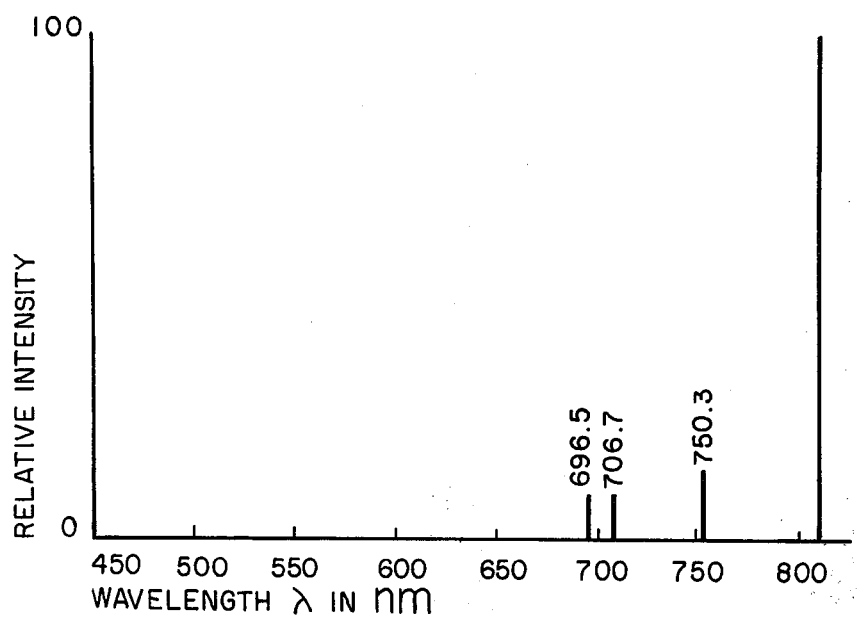
FIG. 3
FIG. 4
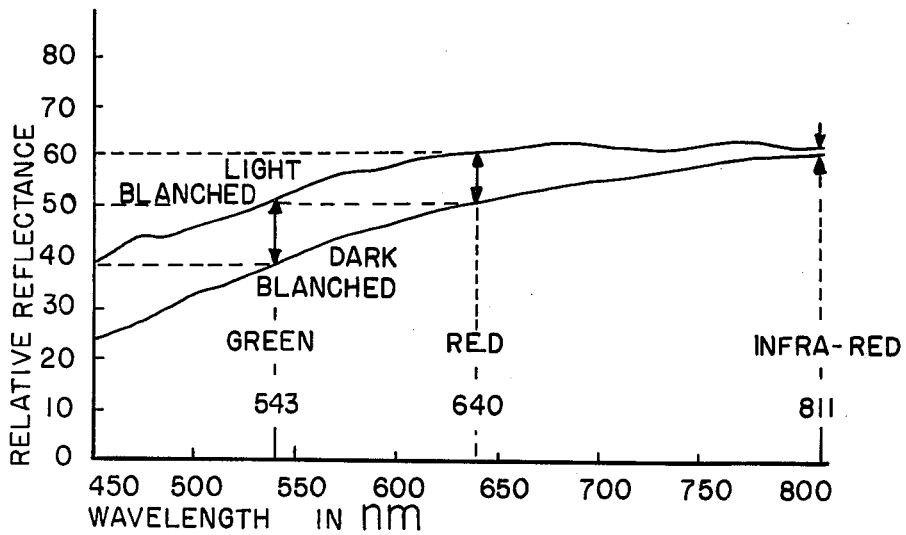

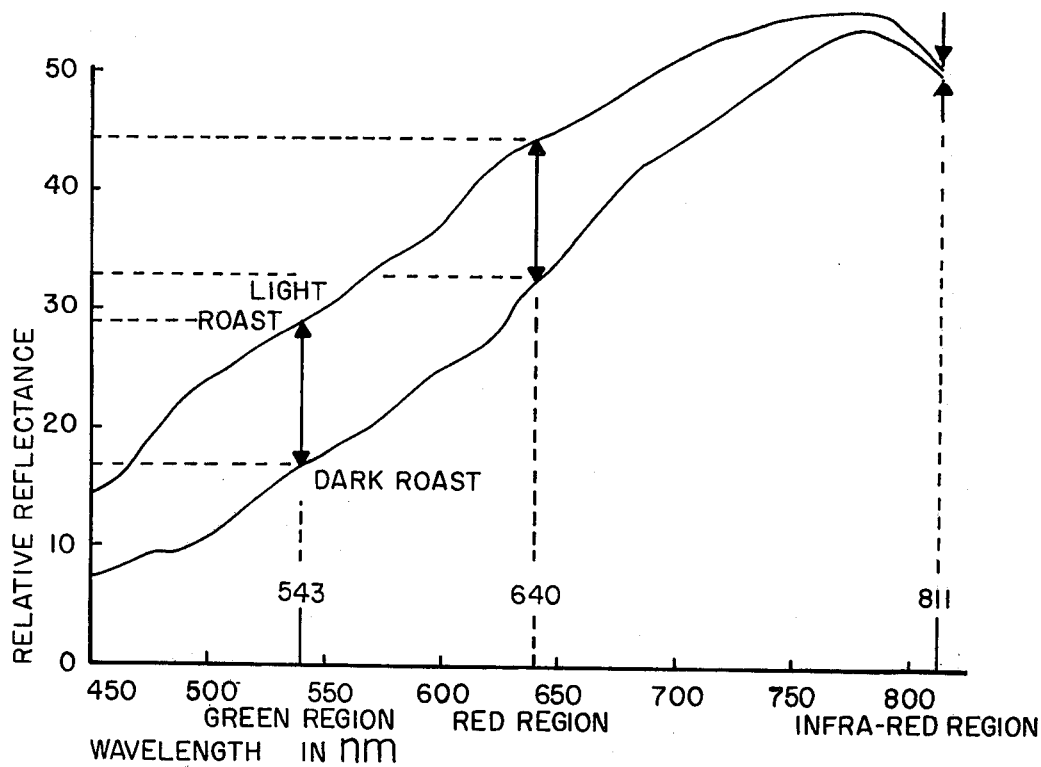
FIG. 5
FIG. 6
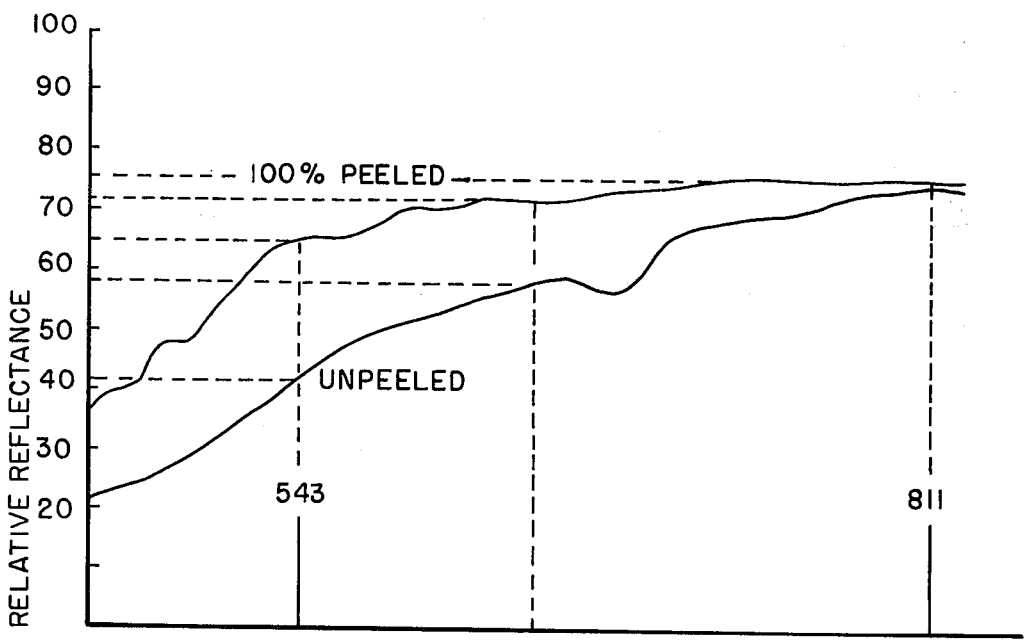

COLOR GRADING APPARATUS UTILIZING INFRARED LIGHT SOURCE

BACKGROUND OF THE INVENTION

This invention is an improvement over the method and apparatus for color grading disclosed in the co-pending U.S. Pat. No. 3,998,555, issued on Dec. 21, 1976, and entitled: Color Grading Apparatus. As discussed in this copending application, there has been utilized, especially in commercial food processing, apparatus for measuring accurately reflected light in various wavelength regions to determine various properties of products.

Such apparatus has been especially useful in the controlling of continuous processing machinery such as equipment for blanching or roasting of peanuts, french-fried potatoes, or for peeling potatoes, et cetera. In such controlled processes, the color of the product is detected as it leaves the processing area. The color changes as the degree of processing is altered and the resultant signal responsive to the color is used to control the processing variables. In this manner the process is controlled continuously for the regulation of the heat to gain a desired degree of cooking or for regulating the degree of peeling a product by altering the speed at which the product is fed through the processor, or for regulating other variables in such equipment.

To eliminate the effects of the reflected light changing in intensity due to such variables as changes in the product volume, distance from the photosensors to the products, et cetera, the reflected light is usually measured in two ranges with the resultant signals compared to generate a ratio signal. By generating such a ratio signal, the variations in the signals resulting from variables not being controlled are canceled out. In the past the light regions measured have usually been centered around 5430 A in the green region and around 6400 A in the red region. By using these wavelength regions, light sources and components are somewhat readily available.

However the degree of change in the ratio in the wavelength regions between the properly processed and improperly processed product is frequently only about 3%. Thus the electronic apparatus used to detect the change in the ratio is required to be quite precise in measuring the changes in light intensities. However the environment in which such equipment operates frequently is of a higher or at least a frequently changing temperature, can be of a high humidity and can involve certain other characteristics such as a poluted atmosphere attendant to the heating, steaming, cooking or processing of food products. Thus it is very difficult to maintain the equipment at the operating precision necessary for measuring such small amounts of change in the light reflectance.

It is the purpose of this invention to provide an improved color grading apparatus capable of effecting a greater amount of change in the signal ratio generated in two light regions for measuring the processing of the product and thereby rendering a more accurate determination of the degree and effectiveness of such processing. Also this invention provides for a more reliable and stable detection of the color ratio by the provision of a unique light source for the infrared light region.

SUMMARY OF THE INVENTION

Apparatus for continuously monitoring and color grading products comprising means for exposing the product to light in the wavelengths of green and infrared light, sensing the reflected light in the green and infrared wavelengths and generating a signal responsive to the ratio of the reflected light in these wavelengths to provide an output signal responsive to the color of the product. The apparatus incorporates an Argon gas discharge lamp for the infrared light source.

BRIEF DESCRIPTION OF THE DRAWINGS

FIG. 1 is a cross-sectional view of a typical product testing device with the circuit in block diagram form in which the invention can be applied;

FIG. 2 shows the Argon gas discharge lamp used in the present invention;

FIG. 3 is a graph of the light intensities and wavelengths emitted by the Argon light source of FIG. 3;

FIG. 4 is a graph of the spectral reflectance versus light frequency of blanched french-fried potatoes representing one product which the invention can be used for sensing;

FIG. 5 is a graph of the spectral reflectance versus light frequency of skinned roasted peanuts; and FIG. 6 is a graph of the spectral reflectance versus light frequency of peeled and unpeeled potatoes.

DESCRIPTION OF THE DRAWINGS

Apparatus suitable for incorporation of the subject invention is shown in FIG. 1 wherein a sample 10 carried by a conveyor belt 11 is tested for color. In a typical system the conveyor carries a product, usually a food product, from an oven or another form of processing station. It is desired to enable the control of the immediately preceding process by testing the color of the product as it comes out and readjusting the process so that the color of the product falls within a predetermined color range thereby indicating a proper processing procedure has been accomplished.

The product is tested by exposing it to light of a predetermined frequency range such as that emitted by the light sources 12 and 14 positioned within the housing 15 and directly above an opening 16 in alignment with and directly over the product being tested. The light sources preferably are of a cylindrical configuration with a center opening through which reflected light from the product can pass to the lens system 17 leading into an enclosed lightproof housing 18. The light thereafter strikes a dichroic mirror 19 which passes one predetermined light region and reflects another. The light passing through the dichroic reflector strikes a filter 20 and a photodiode 21. The reflected light passes through a separate filter 22 and strikes a photodiode 24. In this manner the reflected light is detected in two separate light regions of predetermined frequencies. However the filtering of the reflected light must be efficient to make the light intensities a true indication of the color of the product.

Two light regions are detected which subsequently are compared for the generation of a ratio so as to eliminate variables affecting the reflected light intensities but which have little to do with the color or processing of the product. For instance, if the product quantity on the support or conveyor belt varies, the color of the conveyor belt can show through the lesser quantity product and change the intensity of reflected light in various frequency ranges. In addition, if the product is piled higher in some places than others such that it is closer to the light sources and the lens system 20, the intensity of reflected light also changes. In addition, the overall intensities of the light sources may diminish with use and to some degree the use of two color regions will lessen this effect, however this advantage assumes that the intensities of the two light sources will diminish somewhat equally with time, which is usually true.

By dividing one light intensity signal by the other, the variables due to the physical positioning of the product, et cetera, are canceled out since those properties affect all ranges of reflected light equally thereby leaving only the color change due to the product color change. Thus the signals from the photo detectors 21 and 24 are fed through parallel electrical circuits each including amplifiers 25 and 26, integrators 27 and 28, and additional amplifiers 29 and 30, respectively. The signal is amplified and fed into an analog divider 31 for the generation of a signal responsive to the ratio of the intensities of the reflectance in the two preselected frequency ranges. The output from the analog divider is fed to a readout device 32 which in the normal case is a meter or a recording strip chart. In addition, the signal can be fed to a process control 34 for the purpose of regulating the process occurring immediately preceding the color testing.

Such systems can be used in processes wherein the product is to be heated, for instance in the instance of blanching french-fried potatoes or roasting peanuts wherein the color changes with the intensity of the heating. By measuring the reflectance in predetermined frequency ranges and generating a ratio signal responsive thereto, the process can be regulated to produce a uniformly colored product. In addition, such color sensing apparatus can be applied in potato peelers, et cetera, to test the degree of peeling and control the peeling process so as to minimize waste while rendering an effective peeling of the product. Of course there are many other uses for such controls regulated by color sensing apparatus.

For a more complete description of such color grading apparatus and the functioning of the circuit, reference can be made to U.S. Pat. No. 3,998,555 assigned to the assignee of this invention and identified earlier. The general subject matter of that application typifies the prior art in that the product color is detected in the red and green ranges for controlling the desired process. For instance as shown in FIG. 4, the spectral reflectance of blanched french-fried potatoes changes between those which are light blanched and those which are dark blanched. Thus the signal ratio could be generated and used for controlling the process to render an optimum product color.

In the system just described, if measurements are made in the red and green wavelength regions, for instance at 5430 A and 6400 A, ratios are generated as follows. If the french-fried potatoes are darkly blanched, the reflectance in the green region measures 38 and in the red region measures 51, giving a ratio of 0.745. Similarly for the lightly blanched potatoes, the green region displays a reflectance of 51 and the red region displays a ratio of 61 rendering a ratio of 0.836. Thus there results a change in reflectance ratio of 109 between the light and dark-blanched product. This change represents a 10.8 total difference in ratio in comparison to an average ratio of 0.790 representing an averaged blanched product. More importantly the ratio varies only plus or minus 5.4% from the normal ratio between light and dark blanching.

Turning now to FIG. 5 showing the spectral reflectance for skinned roasted peanuts, the dark roasted peanuts show a reflectance of 17 in the green region and 33 in the red region, giving a ratio of 0.515. With the product roasted lightly the green region renders a reflectance of 29 and the red region 44.5, giving a ratio of 0.65. Thus there is a change in ratio of 0.135 or a 23% change from the average roasted ratio of 0.5825. Thus a plus or minus change of 11.5% must be detected by the color grading apparatus for the effective regulation of the roasting process when sensing the red and green regions.

Looking now at FIG. 6 showing the reflectance of peeled and unpeeled potatoes versus frequency, the same comparison can be made. For unpeeled potatoes the green to red ratio is 41 divided by 58 or 0.707 and for peeled potatoes 65 divided by 72 or 0.903. Thus a reflectance ratio change of 0.196 is representing a total ratio change of 24.3% in comparison to an average reflectance of 0.805. Thus the control must detect a change in ratio of plus or minus 12.1% from the average.

In accordance with the present invention, there is provided an apparatus for enhancing the reflectance ratio thereby increasing the rate of change of reflectance resulting from the change in color of the product. Such is accomplished by utilizing an Argon light source and a green light source for generating the ratios in the green and infrared wavelengths. It has been discovered that the change in reflectance with changes in processing is very slight in the infrared region of approximately 8110 A. Thus the change in reflectance substantially pivots about that infrared light region such that any change in reflectance occurs substantially only in the other selected light region thereby greatly enhancing the change in the reflectance ratio for any product color change. Thus the present invention contemplates the use of an Argon gas discharge tube having a high spectral radiation in the region of 8110 A.

The Argon light source 14 is shown in enlarged detail in FIG. 2. The hollow tubular glass envelope 36 is formed in a circle as previously described with a pair of conductors 37 and 38 extending from each end. The Argon is introduced into the envelope to an approximate pressure of 12 millimeters of mercury. When the electrodes are energized, the Argon gas emits light in the wavelength regions shown in the graph of FIG. 3. As can be seen, the predominate light emitted is in the region of 8115 A while substantially insignificant emissions are detected in the wavelength regions of 6965 A.

With substantially all of the light emitted being in the infrared light region, subsequent filtering to separate out the desired infrared light is greatly simplified. Also such an Argon lamp will operate in series connection with other gaseous discharge tubes such as the type to emit the green wavelength light region, i.e. neon, to give a ratiometric measurement in both the visible and infrared light regions without the expense and complexity of duplicate regulation circuits and complex filtering. Otherwise the power supplied to individually connected lamps must be closely regulated to assure that power changes and the resultant light intensity changes in one lamp are not erroneously interpreted as being due to color changes in the product. Argon as a light emitting gas has been found to be a very stable, inert light source which is relatively temperature independent.

The emitted light remains stable in wavelength even with aging of the lamp and small voltage changes in the power circuit, a necessity for use in such color grading apparatus described heretofore.

For emission in the other light region, the preferable light source is in the green color range thereby requiring a neon tube with an orange fluorescent coating to obtain a strong green light radiation. The system as shown in FIG. 1 in block diagram form is used with one light channel being tuned to the infrared frequency range and the ratio readout system adjusted to accommodate the greater ranges of ratio changes with color changes in the product.

To point out the advantages of the present invention, reference is now made to FIG. 4 showing that the light and dark-blanched product changes very little in reflectance in the area of 8110 A. Thus for a dark-blanched product there is a reflectance in the green region of 38 and in the infrared region of 60, giving a ratio of 0.63. For the light-blanched product, the reflectance in the green range is 51 and in the infrared range is 62, giving a ratio of 0.82 or a change of 0.19 or a 26% change in the ratio from an average ratio reading of 0.725 in contrast to a 10.8% change when the red and green areas were utilized.

Turning now to FIG. 5, the reflectance ratio for the dark-roasted peanuts is in the green region 17 divided by 50.5 which equals 0.336 and for the light-roasted peanuts 29 divided by 51 or 0.57, giving a reflectance change of 0.23 or a percentage change of 51% from an average ratio of 0.45. Thus it can be seen that a much greater percentage change in the ratio (51% compared to 23% previously calculated) is gained by detecting the green and infrared regions in contrast with that of the green and red regions. Similar changes will be encountered in other processes in the same manner. With respect to FIG. 6, the unpeeled potatoes render a ratio of 0.55 from a green reflectance of 41 and an infrared reflectance of 75. The peeled potatoes render a ratio of 0.85 from a green reflectance of 65 and an infrared reading of 76. Thus the ratio change is 0.30 for a 49% change in comparison to an average ratio reading of 0.70 compared to a ratio change of 24.3% using the green and red ranges.

Based on the foregoing examples, the average percentage change in the ratio is 42% in comparison to the average ratio change of 19.4% in prior art color ratio detectors using the red and green light regions for the ratio determination. Obviously the increase in the ratio change with color change greatly enhances the operating capabilities of any process control utilizing the color change ratio for regulation purposes.

The invention claimed is:

1. Apparatus for monitoring the color of a product, comprising in combination:
   an Argon gas discharge light source for emitting infrared energy in the frequency region of 8110 A;
   a light source for emitting light in the green wavelength region of approximately 5430 A;
   means for directing the light from the Argon and green light sources onto the product;
   light transmitting means for receiving the light reflected from said product; and
   means for generating a ratio signal responsive to the relative intensities of the infrared and green light reflected from the product.

2. Apparatus as defined in claim 1 wherein said green light source comprises a neon filled lamp having an orange fluorescent coating.

3. Apparatus as defined in claim 1 wherein said Argon gas discharge light source comprises a transparent hollow envelope filled with Argon gas at a pressure of 12 millimeters mercury in combination with electrode means for imposing a voltage across said gas.

* * * * *